United States Patent [19]

Narishige et al.

[11] Patent Number: 4,700,584
[45] Date of Patent: Oct. 20, 1987

[54] MANIPULATOR USABLE FOR A GLASS ELECTRODE OR THE LIKE

[75] Inventors: Eiichi Narishige; Shinji Yoneyama, both of Tokyo, Japan

[73] Assignee: Narishige Corporation, Ltd., Tokyo, Japan

[21] Appl. No.: 853,714

[22] Filed: Apr. 18, 1986

[30] Foreign Application Priority Data

Feb. 15, 1986 [JP] Japan .............................. 61-020547[U]

[51] Int. Cl.$^4$ .............................................. G05G 11/00
[52] U.S. Cl. .................................. 74/479; 74/471 XY; 60/533; 269/71
[58] Field of Search ................... 74/471 XY, 479, 522; 60/533; 350/530, 531; 269/71, 73

[56] References Cited

U.S. PATENT DOCUMENTS

| | | | |
|---|---|---|---|
| 2,615,233 | 10/1952 | Ferris | 60/533 X |
| 3,173,263 | 3/1965 | Porter | 60/533 |
| 3,783,707 | 1/1974 | Foederer et al. | 74/479 X |
| 4,281,561 | 8/1981 | Groskopfs | 74/471 XY |
| 4,365,521 | 12/1982 | Kohler | 74/471 XY |

FOREIGN PATENT DOCUMENTS

| | | | |
|---|---|---|---|
| 1020189 | 11/1957 | Fed. Rep. of Germany | 350/531 |
| 1230640 | 12/1966 | Fed. Rep. of Germany | 350/531 |

*Primary Examiner*—Allan D. Herrmann
*Attorney, Agent, or Firm*—Cushman, Darby & Cushman

[57] ABSTRACT

A manipulator usable for a glass electrode or the like comprises roughly moving mechanisms for roughly moving the glass electrode not only in the longitudinal and lateral directions but also in the heightwise direction, as well as a finely moving mechanism for finely moving the glass electrode in the longitudinal and lateral directions. It further comprises an operation lever, which is provided interiorly with a hydraulic cylinder capable of being pushed by a piston interlocking with an operation knob. A base member and a slider slidable in the heightwise direction relative thereto are incorporated into any one of the roughly moving mechanisms. Between the base member and the slider there are disposed a piston and a second hydraulic cylinder, said second hydraulic cylinder being connected to the hydraulic cylinder within the operation lever.

3 Claims, 4 Drawing Figures

MANIPULATOR USABLE FOR A GLASS ELECTRODE OR THE LIKE

BACKGROUND OF THE INVENTION

1. (Field of the Invention)

The present invention relates to a manipulator for finely moving, in the form of remote control, a glass electrode or the like which is utilized to take out genetic information from within a cell in the field of fundamental medical science or in the field of biotechnology such as gene manipulation having in recent years undergone extensive study in many quarters.

2. (Description of the Prior Art)

Recently, a glass electrode injected therein with an electrolyte such as KCl, NaCl or the like has been utilized to take out information from within a cell in the field of biotechnology in particular which includes gene manipulation. The glass electrode is moved to a specified position of the cell by a manipulator and is positioned there. The manipulator is mounted with the glass electrode and comprises a roughly moving mechanism for roughly moving the glass electrode in the vertical or heightwise direction as well as in the longitudinal and lateral directions, and a finely moving mechanism for finely moving the glass electrode in both the longitudinal and lateral directions. This old manipulator, however, has no finely moving mechanism for moving the glass electrode in the heightwise direction. For this reason, the use of it is limited to the glass electrode either not required to undergo a heightwise fine movement or not so much required to be adjusted with high precision. In recent years, however, not a few glass electrodes, in particular, which are required to be adjusted with high precision, have appeared. Thus, the old manipulator has become inconvenient to handle such glass electrodes. As a countermeasure, it is contemplated to add to the old manipulator a heightwise finely moving mechanism having a known construction wherein rotation of an operation knob causes a rod to push a spring to finely move a slider associated via this spring. In this type of manipulator, however, since an operation lever of the longitudinally and laterally finely moving mechanism is spaced away from the operation knob of the heightwise finely moving mechanism, much inconvenience arises in operating such a lever and a knob while the operator is viewing or observing a microscope.

SUMMARY OF THE INVENTION

The present invention has been made in view of the above-mentioned prior art problems and the object thereof is to provide a manipulator usable for a glass electrode or the like, which can not only finely move by use of a single lever the glass electrode in both the longitudinal and lateral directions but also finely move the same in the heightwise direction, thus offering a great convenience in being used.

To attain the above object, according to the present invention there is provided a manipulator usable for a glass electrode or the like, which is equipped with roughly moving mechanisms for roughly moving the glass electrode not only in the longitudinal and lateral directions but also in the heightwise direction as well as with a finely moving mechanism for finely moving the glass electrode in the longitudinal and lateral directions, and which includes a small spherical body projectively provided on a first base member permitting the finely moving mechanism to be interlocked with the roughly moving mechanisms, a large spherical body which has a receiving bore and which permits the small spherical body to be engaged therewith in a state wherein the position of its center is displaced from that of a center of the small spherical body and which is rotatably pivoted to a slider longitudinally slidable with respect to the first base member in a state wherein a slider laterally slidable with respect to the first base member is interposed between the longitudinally slidable slider and the first base member, and an operation lever for rotating the large spherical body, said manipulator comprising a hydraulic cylinder which is disposed within the operation lever and adapted to be pushed by a piston caused to interlock with an operation knob, a second base member and a slider heightwisely slidable with respect thereto which are incorporated into any one of the longitudinally, laterally and heightwisely movable mechanisms, and a piston and second hydraulic cylinder which are interposed between the second base member and the slider associated therewith, said second hydraulic cylinder being connected to the first-mentioned hydraulic cylinder disposed within the operation lever.

BRIEF DESCRIPTION OF THE DRAWINGS

The drawings illustrate a manipulator usable for a glass electrode or the like according to an embodiment of the invention, and, FIG. 1 is a perspective view of the manipulator as a whole.

DESCRIPTION OF THE PREFERRED EMBODIMENT

Figure 1:
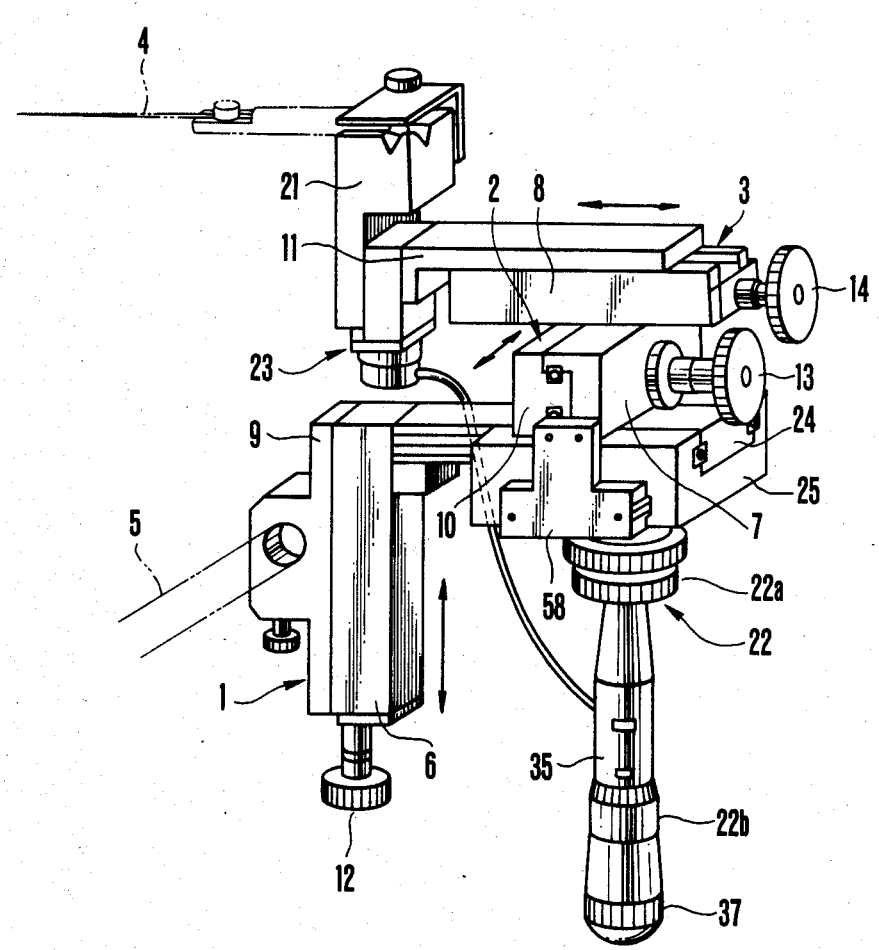

A manipulator usable for a glass electrode or the like according to an embodiment of the invention will now be described with reference to the drawings. In FIG. 1, a reference numeral 1 denotes a roughly moving mechanism for roughly moving a glass electrode in the heightwise direction (hereinafter, referred to as "Z-(coordinate)axis"), a reference numeral 2 denotes a roughly moving mechanism for roughly moving the glass electrode in the longitudinal direction (hereinafter, "Y-(coordinate)axis"), a reference numeral 3 denotes a roughly moving mechanism for roughly moving the glass electrode in the lateral direction (hereinafter, "X-(coordinate)axis"), and a reference numeral 4 denotes the glass electrode. The Z-(coordinate)axis roughly moving mechanism 1 is constructed such that its slider 9 which will be described later is secured to a stand 5. The Z-, Y-, and X-axis roughly moving mechanisms 1, 2 and 3 are constituted by base members 6, 7 and 8 and sliders 9, 10 and 11, respectively. Base member 8 and slider 10 are fixed to each other for joint movement. It is known that when operation knobs 12 and 14 are respectively turned, the sliders 9 and 11 are caused to slide with respect to their corresponding base members in the Z- and X-axial directions, respectively, by cooperation of a screw 17 and a nut 15 threadly engaged therewith and by cooperation of a nut 16 and a screw 18 threadly engaged therewith. It is also known that the slider 10 is caused to slide via a leaf spring 20 by pushing a pressing rod 19. The pushing is caused by the rotation of an operation knob 13. Through the respective sliding movements of the sliders 9, 10 and 11, the glass electrode 4 mounted on a mounting base 21 is roughly moved in the X-, Y- and Z-axial directions.

Figure 2:
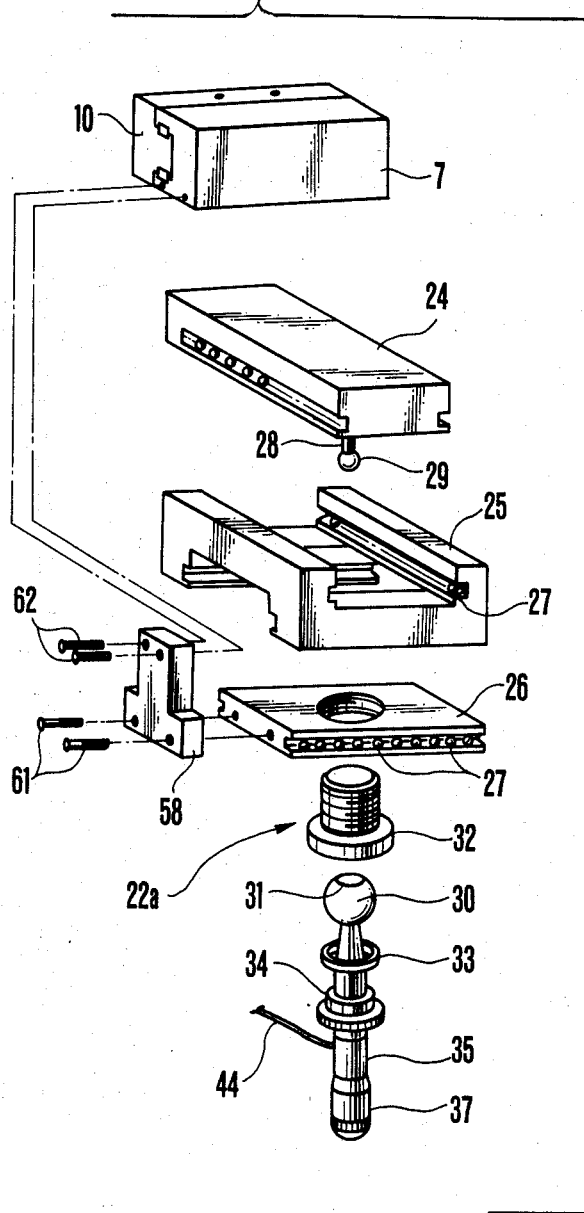
FIG. 2 is an exploded perspective view of an essential part of the manipulator.
Figure 3:
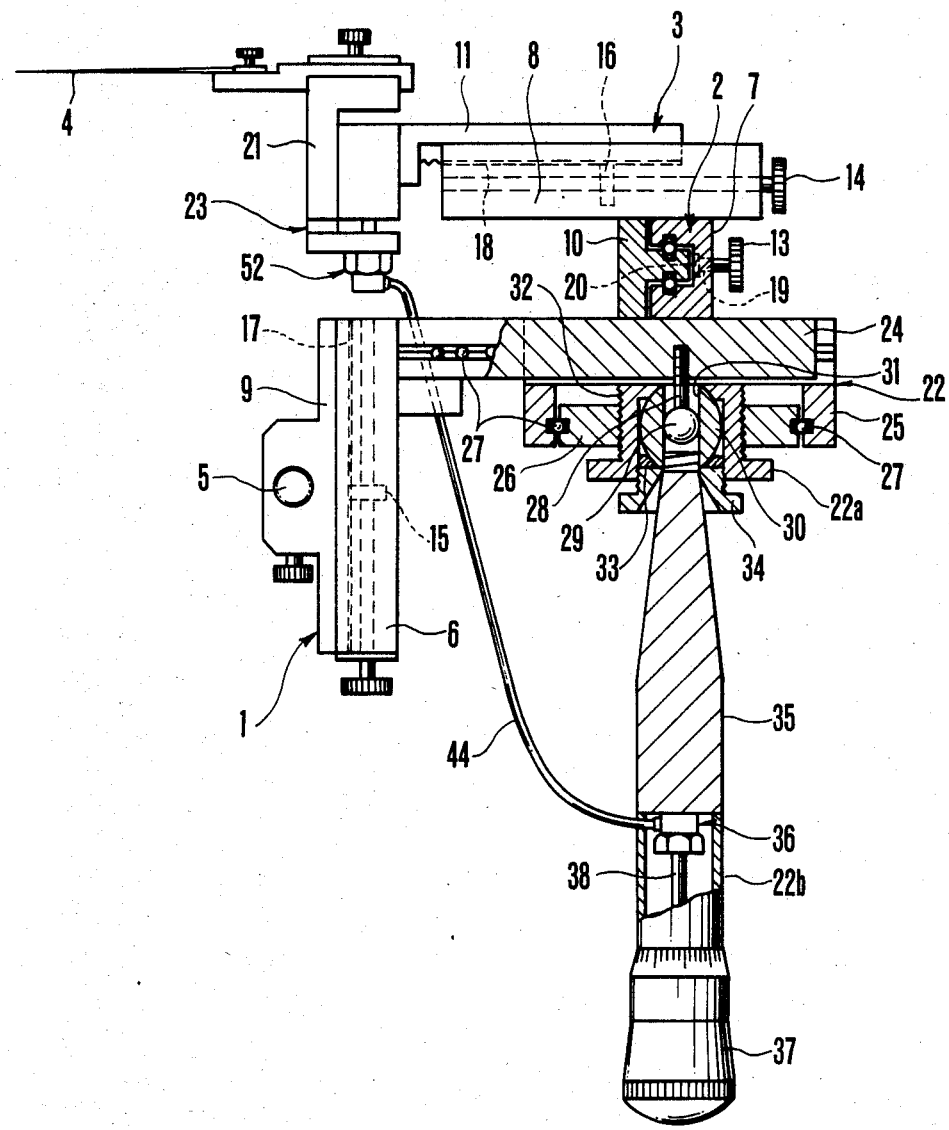
FIG. 3 is a front view of the manipulator, taken with an essential part thereof in section.
Figure 4:
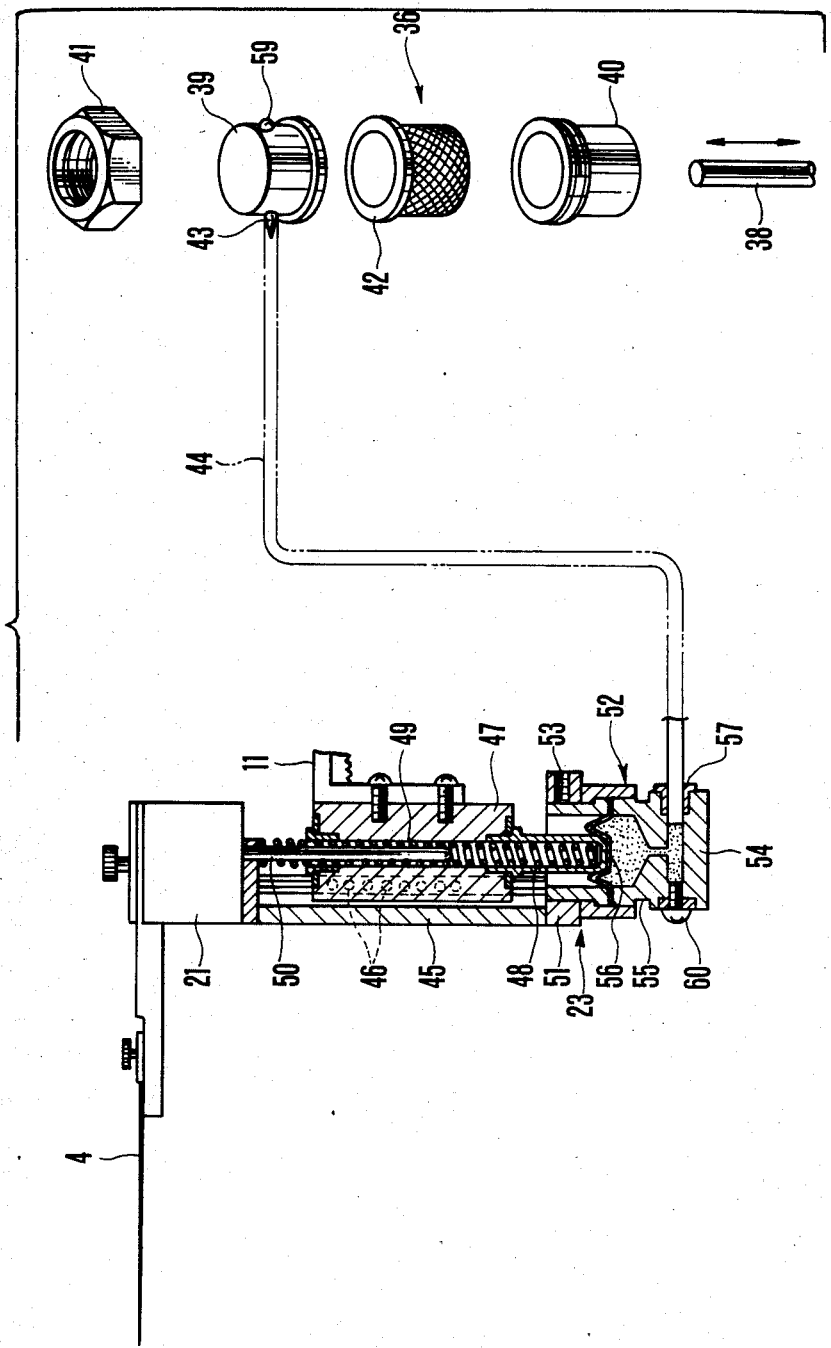
FIG. 4 is a view showing the construction of an essential part of the manipulator.

According to the invention, an X-Y-Z axes finely moving mechanism 22 is disposed between the Z-axis roughly moving mechanism 1 and Y-axis roughly moving mechanism 2. Further, a pressure reception finely moving section 23 which is operated by the X-Y-Z axes finely moving mechanism 22 is disposed between the mounting base 21 and the X-axis roughly moving mechanism 3. The X-Y-Z axes finely moving mechanism 22 comprises an X-Y axes finely moving mechanism 22a which utilizes a leverage, and a Z-axis finely moving mechanism 22b which operates with the use of a hydraulic cylinder. As shown in FIGS. 2 and 3, the X-Y axes finely moving mechanism 22a has an X-Y axes finely moving base member 24 secured to the base member 6 of the Z-axis roughly moving mechanism 1, said X-Y axes finely moving base member 24 being mounted with an X-axis finely moving slider 25 slidable in the X-axial direction. This X-axis finely moving slider 25 is mounted with a Y-axis finely moving slider 26 slidable in the Y-axial direction. A suitable number of steel balls 27 are interposed between the X-Y axes finely moving base member 24 and the X axis finely moving slider 25 as well as between this slider and the Y-axis finely moving slider 26. A small spherical body 29 is suspended from the underside of the X-Y axes finely moving base member 24 via a supporting rod 28. A receiving bore 31 of a large spherical body 30 is rotatably fitted over the small spherical body 29. The large spherical body 30 is rotatably borne within a sleeve 32 screwed into the Y-axis finely moving slider 26. To the sleeve 32 is screwed a retaining ring 34 via a slip ring 33 made of synthetic resin, so as to prevent the large spherical body 30 from being withdrawn from the sleeve 32. An operation lever 35 is attached to the large spherical body 30 in such a manner that the former is suspended or extended downwards from the latter. The action performed in connection with the sleeve 32 is as follows. That is, if the screwed amount of the sleeve 32 as measured with respect to the Y-axis finely moving slider 26 is adjusted, the distance between the center of the small spherical body 29 and that of the large spherical body 30 will be varied, whereby it is possible to freely vary the amounts of respective sliding movements of the X-axis finely moving slider 25 and Y-axis finely moving slider 26 as measured with respect to the amount of tilt of the operation lever 35. Within the operation lever 35, there is disposed the Z-axis finely moving mechanism 22b of hydraulic-cylinder system. Namely, the Z-axis finely moving mechanism 22b has a hydraulic cylinder 36 as shown in FIGS. 3 and 4. The hydraulic cylinder 36 is fitted in the operation lever 35. Alternatively, it is fixed thereto by means of, for example, set screws. On the other hand, an operation knob 37 is screwed to a lower end portion of the operation lever 35 and this knob 37 is provided with a piston 38. Operation lever 35 is kept from rotating from the rotation of operation knob 37 by friction which is generated between retaining ring 34 and the operation lever 35. The hydraulic cylinder 36 is constituted by a cylinder body 39 formed interiorly with a hydraulic chamber, and a diaphragm 42 clamped between the cylinder body 39 and a cylindrical case 40 (having threads 40b thereon by means of a screw ring 41. The cylinder body 39 is provided with a connection port 43 which is connected to a pressure reception finely moving section 23 by means of a tube 44, The section 23 is constructed as follows. As shown in FIGS. 1, 3 and 4, a base member 45 is secured to the mounting base 21. The member 45 is mounted thereto with a slider 47 slidable in the Z-axial direction with steel balls 46 interposed therebetween. The slider 47 has a hollow piston 48 axially fixed thereto at its lower end portion and, between this piston 48 and the base member 45, a return spring 49 is interposed. A spring retaining rod 50 which is extended downwards from the base member 45 is inserted into the return spring 49. To the lower end of the base member 45 is secured a ring-like bracket 51, to which there is secured by means of set screws 53 a hydraulic cylinder 52 having a construction similar to that of the above-mentioned cylinder 36. That is, the hydraulic cylinder 52 is constituted by a cylinder body 54 having a hydraulic chamber, diaphragm 56, and a screw ring 55. The cylinder body 54 has a connection port 57 to which there is connected the connection port 43 of the hydraulic cylinder 36 by means of a tube 44. Water or silicone oil is sealed between the hydraulic cylinders 36 and 52. The slider 47 is secured to the slider 11 of the X-axis roughly moving mechanism 3. The base member 8 of the X-axis roughly moving mechanism 3 is secured to the slider 10 of the Y-axis roughly moving mechanism 2. The base member 7 of the Y-axis roughly moving mechanism 2 is fixed at one side to one end of the Y-axis finely moving slider 26 by means of a bracket 58 and set screws 61 and 62.

It is to be noted here that reference numerals 59 and 60 in FIG. 4 are valves having the same construction, which are intended to be used, for example, for releasing air.

In operation of the manipulator usable for a glass electrode or the like having the foregoing construction, the respective operation knobs 12, 13 and 14 of the Z-, Y- and X-axis roughly moving mechanisms 1, 2 and 3 are turned. This causes the sliding movement between one of the base members 6, 7, 8 and a corresponding one of the sliders 9, 10 and 11. By so doing, the glass electrode 4 mounted on the mounting base 21 is roughly positioned relative to a predetermined position. If, thereafter, the operation lever 35 is tilted in a direction in which the glass electrode 4 is desired to be moved, the X-axis finely moving slider 25 and Y-axis finely moving slider 26 is caused to slide with respect to the X-Y axes finely moving base member 24 so as to be in conformity with the direction in, and the amount by, which the operation lever 35 is moved. As a result, the glass electrode 4 is finely moved via the bracket 58, X-axis roughly moving mechanism 3, pressure reception finely moving section 23 and the mounting base 21 in the sliding directions, as well as in corresponding relationship to the amounts slided, of the X- and Y-axis finely moving sliders 25 and 26. This fine movement is made in the X-axial and Y-axial directions. Further, by turning the operation knob 37, the piston 38 appears or disappears with respect to the hydraulic cylinder 36. This causes a variation of the force with which the piston 38 presses the diaphragm 42. This causes a pressurizing or depressurizing of the hydraulic chamber within the cylinder body 39. The variation in pressure of the hydraulic chamber within the cylinder body 39 is transmitted, via the tube 44, to the hydraulic cylinder 52 of the pressure reception finely moving section 23 to thereby vary the pressure of the hydraulic chamber within the hydraulic cylinder 52. Namely, if the interior of the hydraulic cylinder 36 (hydraulic chamber) is pressurized, the pressure in the hydraulic cylinder 52 (hydraulic chamber) will increase, whereby the diaphragm 55 presses the piston 48. As a result, the base member 45 is lowered relative to the slider 47 and in consequence the glass electrode 4 also is allowed to fall. Conversely, if the interior (hydraulic chamber) of the hydraulic cylinder 36 is depressurized, the pressure in the hydraulic cylinder 52 (hydraulic chamber) will decrease in level. As a result, the base member 45 is raised relative to the slider 47 by receiving the elastic urging force of the return spring 49, so that the glass electrode 4 also is raised. In this way, actuation of the operation lever 35 alone enables the glass electrode 4 to be finely moved in the X-, Y- and Z-axial direction to any desired position.

The invention is not limited to being used for a glass electrode 4 but also may be applicable for various physicochemical instruments as well. As has been described above, according to the present invention, there is provided the manipulator usable for a glass electrode or the like which is equipped with the roughly moving mechanisms for roughly moving the glass electrode not only in the longitudinal and lateral directions but also in the heightwise direction as well as with the finely moving mechanism for finely moving the glass electrode in the longitudinal and lateral directions, and which includes the small spherical body projectively provided on the first base member permitting the finely moving mechanism to be interlocked with the roughly moving mechanisms, the large spherical body which has the receiving bore and which permits the small spherical body to be engaged therewith in a state wherein the position of its center is displaced from that of a center of the small spherical body and which is rotatably pivoted to the slider longitudinally slidable with respect to the first base member in a state wherein a slider laterally slidable with respect to the first base member in a state wherein a slider laterally slidable with respect to the first base member is interposed between the longitudinally slidable slider and the first base member, and the operation lever for rotating the large spherical body, said manipulator comprising the hydraulic cylinder which is disposed within the operation lever and adapted to be pushed by the piston caused to interlock with the operation knob, the second base member and the slider heightwisely slidable with respect thereto which are incorporated into any one of the longitudinally, laterally and heightwisely movable mechanisms, and the piston and second hydraulic cylinder which are interposed between the second base member and the slider associated therewith, said second hydraulic cylinder being connected to the first-mentioned hydraulic cylinder disposed within the operation lever. Therefore, a glass electrode or the like can be finely moved, by use of a single lever, not only in the longitudinal and lateral directions but also in the heightwise direction. This eliminates the necessity of operator's groping for one of a plurality of operation levers in finely moving the glass electrode while the operator is observing through a microscope. Thus, the manipulator according to the present invention is very convenient to handle and can be manufactured at a lower cost.

What is claimed is:

1. A manipulator assembly for moving a glass electrode or the like in a lateral, a longitudinal and a heightwise direction, comprising:
   means for providing a rough adjustment of the position of the glass electrode in the lateral, longitudinal and heightwise direction;
   a first base member which is adjustable in the heightwise direction by said rough adjustment means, said first base member having a small spherical body projectively provided thereon;
   means for providing fine adjustment of the position of the glass electrode in the longitudinal and lateral direction; including a large spherical body having a receiving bore defined therein, a sleeve adapted to be operably connected to the glass electrode for housing the large spherical body, a first fine movement slider means for allowing the sleeve to move relative to the first base member in the lateral direction, and operation lever means for rotating the large spherical member relative to the sleeve, the small spherical body being receivable in said receiving bore, whereby movement of the operation lever means causes the glass electrode to finely move in the lateral and longitudinal direction;
   a hydraulic cylinder disposed in said operation lever means having a diaphragm therein and operation knob mounted thereon for actuating said diaphragm; and
   hydraulic means for providing fine adjustment at the position of the glass electrode in the heightwise direction, said hydraulic means being actuatable by fluid supplied from said hydraulic cylinder, whereby a glass electrode may be positioned by being moved to an approximate desired position by said rough adjustment means, and to a final position by using said fine adjustment means and said hydraulic means.

2. A manipulator assembly according to claim 1, further comprising
   a second base member connected to said housing sleeve; and
   wherein said rough adjustment means includes a rough height adjustment means for adjusting the height of said first base member; a rough lateral adjustment means for adjusting the lateral position of the glass electrode relative to said second base member and a rough longitudinal adjustment means for adjusting the longitudinal position of the glass electrode relative to said second base member.

3. A manipulator assembly according to claim 1, further comprising means for securing said large spherical body from movement relative to said sleeve.

* * * * *